March 2, 1971 J. E. HARRINGTON 3,566,640

INSPECTION AND CORRECTION APPARATUS

Filed Aug. 26, 1968 2 Sheets-Sheet 1

INVENTOR.

*Terry E. Harrington*

BY

*Harness, Talburtt & Baldwin*

ATTORNEYS.

INVENTOR.
*Jerry E. Harrington*
BY
*Harness, Talburtt & Baldwin*
ATTORNEYS.

United States Patent Office 3,566,640
Patented Mar. 2, 1971

1

3,566,640

INSPECTION AND CORRECTION APPARATUS

Jerry E. Harrington, Center Line, Mich., assignor to Chrysler Corporation, Highland Park, Mich.

Filed Aug. 26, 1968, Ser. No. 755,355
Int. Cl. B21b *37/00*
U.S. Cl. 72—10 7 Claims

ABSTRACT OF THE DISCLOSURE

A machine for detecting and correcting dimensional irregularities of curved surfaces such as piston rings, gears, bearings and the like. The workpiece being inspected is rotated within a set of jaws and a sensor is positioned adjacent the workpiece which is capable of generating an output signal in response to an out of round condition. This signal results in the actuation of one of the jaw members which is capable of compressing the workpiece to thereby eliminate the high point.

BACKGROUND OF THE INVENTION

This invention relates to the detection and correction of dimensional irregularities of a curved surface and, in particular, to a machine for sensing out of roundness or eccentricity of a circular surface of a gear wheel or the like, and for automatically applying corrective force to the circular surface to bring it into an acceptable degree of roundness. The machine is of simple construction since it employs a minimum of components and, yet, can be easily adjusted to inspect and correct a wide variety of workpieces having curved surfaces, thereby providing for substantial savings in machine investment.

The provision of correct function, efficient operation, and long service life of items such as bearings and gears requires accurate manufacture and careful inspection. Such inspection, however, is frequently conducted by means of hand or visual measuring instruments which raises the problems of insufficient accuracy and errors attributable to the performance of the individual inspectors. Accordingly, much emphasis has been placed on the development of machines suitable for carrying out inspection functions. Generally, such machines only serve to detect inaccuracies and, if inaccuracies are found, reject the article. At this point, the article or workpiece must then be taken and reworked in a separate operation to remove the deficiencies and then replaced in the inspection operation to ascertain if the workpiece meets the necessary standards. As can be appreciated, this procedure still leaves much to be desired as it requires frequent handling of the workpiece, and is time consuming and therefore expensive. Efforts to overcome such problems by combining the inspection and correction operations have not heretofore found wide acceptance due to the complexity and costs of machines capable of carrying out the dual role of inspection and correction.

SUMMARY OF THE INVENTION

From the foregoing, it will be recognized that an automatic device is needed which is capable of providing inspection of an article and correction of dimensional irregularities therein when required and, yet, which is relatively economical, simple in construction and operation and which provides extremely accurate results.

Accordingly, it is an object of this invention to provide a novel device for sensing and correcting dimensional irregularities of a curved surface of an article.

A further object is to provide an inspection and correction device which is of uncomplicated construction, economical and which is easily adjusted to handle a wide variety of workpieces.

2

A more specific object is to provide an automatic device for indicating an out of round condition of an article of any selected diameter and for automatically correcting the out of roundness when such condition is detected.

Other objects and advantages of the present invention will become apparent from a further reading of the description and the appended claims.

Briefly, the apparatus of this invention comprises a support for the article to be inspected, driving means to rotate the article on the support and a plurality of jaw members capable of lightly engaging the article to define its axis of rotation with respect to the support. A sensor is located adjacent the article which is capable of producing signals in response to dimensional irregularities in a curved surface of the article as the article rotates past the sensor. The sensor is interconnected with a logic network such that an output signal from the sensor in response to a dimensional irregularity is fed into the logic network which is so designed that it can remember if and where the irregularity occurred on the surface of the workpiece and, upon completion of a scan thereof, will position the workpiece, through actuation of the driving means, adjacent a pressure producing cylinder or ram. The ram which is responsive to the logic network is then triggered to apply pressure to the workpiece so as to reshape it.

While the apparatus of this invention can be adapted to workpieces of widely varying shapes, it finds special application in the inspection and correction of dimensional irregularities in circular articles such as gears, rings or bearing races. In this application, the ram portion of the apparatus preferably comprises one of the jaw members which is power actuated and the logic network returns the high point on the gear to a position in engagement with this jaw. Actuation of the jaw by the logic network then compresses the gear within the elastic limit of the material of which the gear is composed. It has been found that such compression is nearly always sufficient to bring the gear to within acceptable standards of roundness or circularity. Upon being compressed the gear is then rotated through 360° and scanned. If another high point is detected by the sensor then the cycle is repeated, otherwise the gear is automatically ejected from the apparatus.

DESCRIPTION OF THE DRAWINGS

In the accompanying drawings in which various possible embodiments are illustrated.

Like parts are indicated by corresponding reference characters throughout the several views of the drawing.

DESCRIPTION OF THE PREFERRED EMBODIMENT

Figure 1:
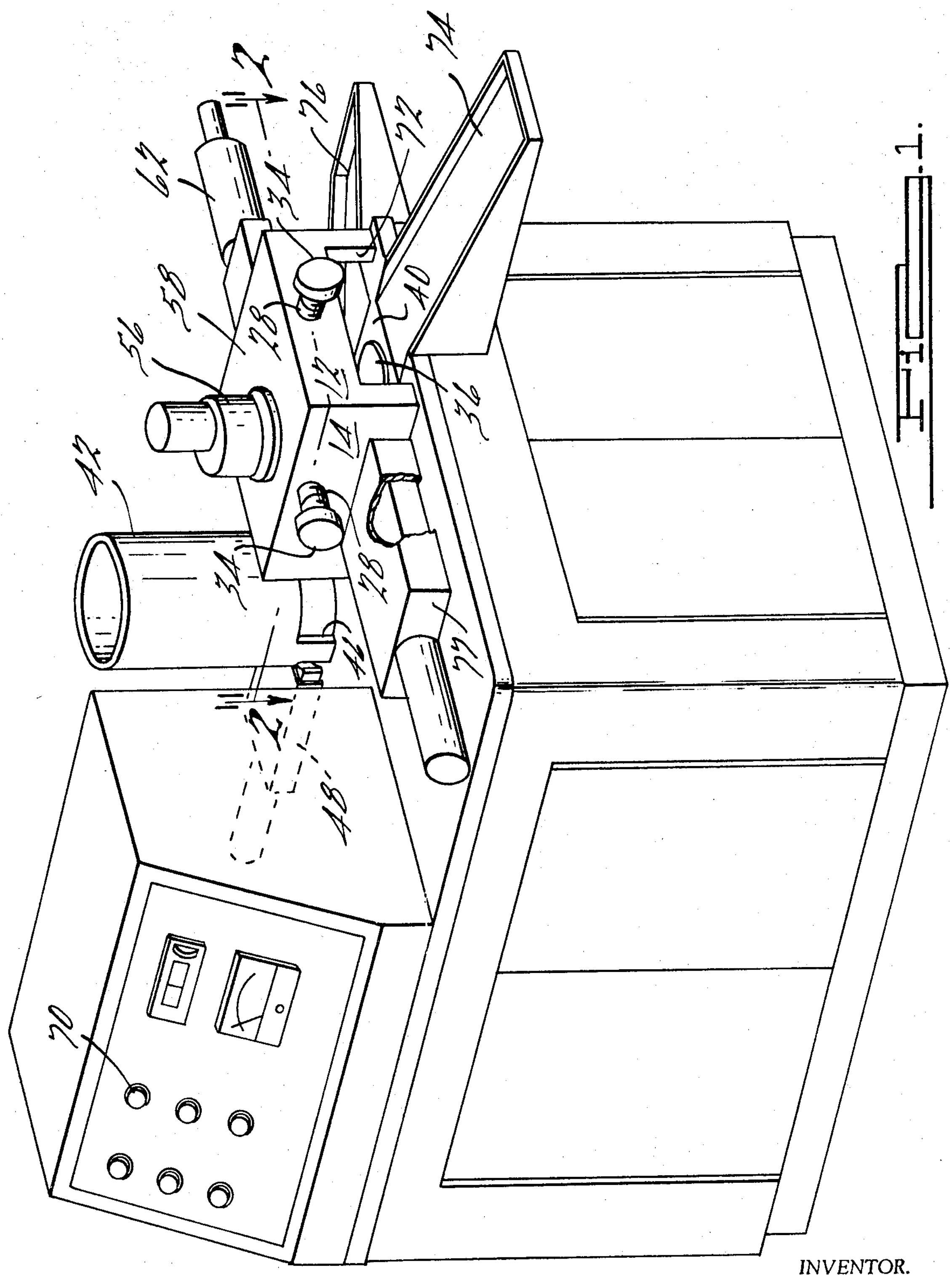
FIG. 1, is a perspective view of a gear inspection apparatus constructed in accordance with the present invention.
Figure 2:
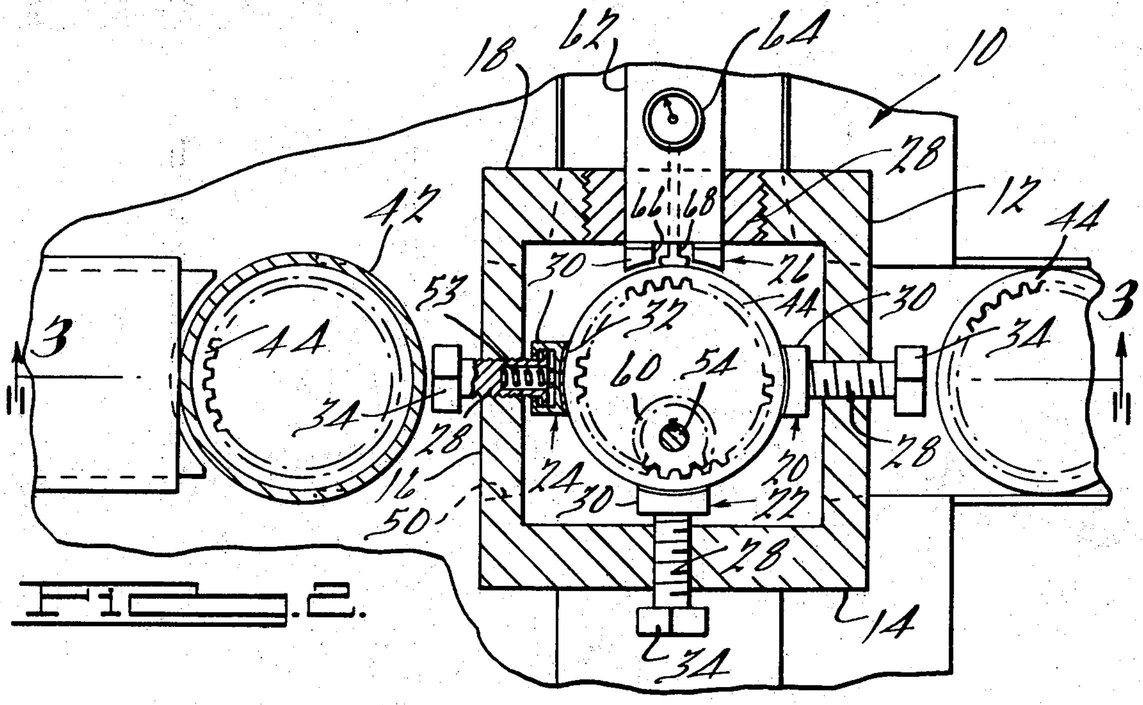
FIG. 2, is a section view taken along the line 2—2 of FIG. 1.

The apparatus of this invention for detecting and correcting dimensional irregularities is shown in FIGS. 1–4 and comprises, as seen with particular reference to FIG. 2, a frame indicated generally by reference numeral 10, composed of cooperating frame side wall numbers 12, 14, 16 and 18. Jaw members indicated generally by numerals 20, 22, 24, and 26 are supported by the frame side numbers 12, 14, 16 and 18, respectively. Each jaw member is composed of a shaft portion 28 which is threadedly engaged with the side wall, and a pad 30 carried by the shaft which is provided with a surface portion 32 generally conforming to the curved surface of the article to be tested. Each shaft portion 28 is provided with a handle 34 (not shown for jaw member 26) whereby the jaw member can be moved in a direction generally normal to its supporting frame side wall.

Figure 3:
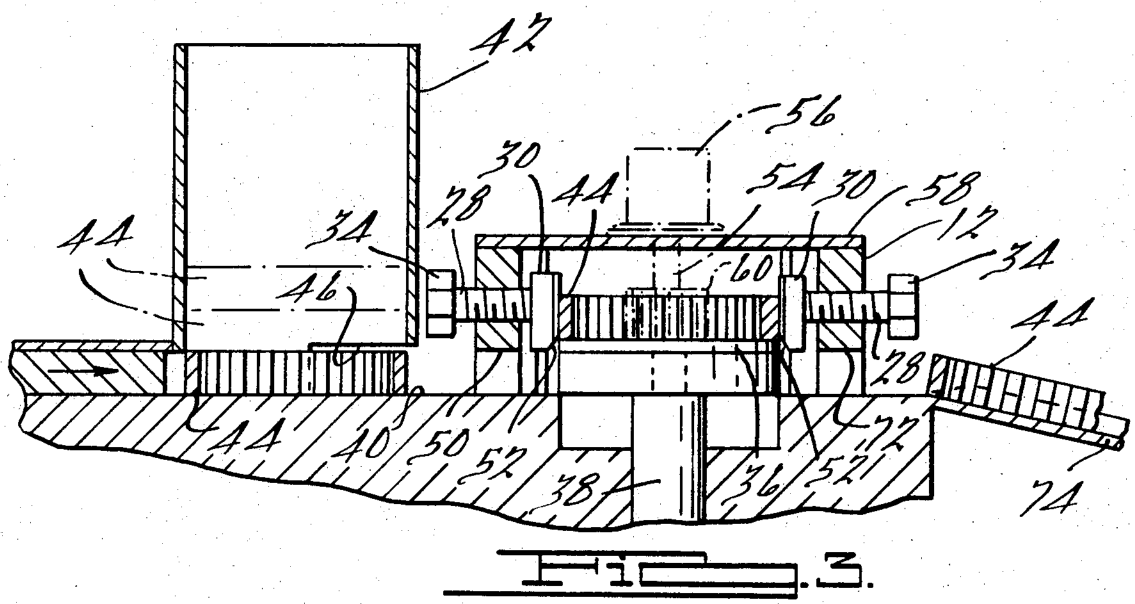
FIG. 3, is a sectional elevational view taken generally along the line 3—3 of FIG. 2.

A platform 36 is provided which is carried by a hydraulic or pneumatic cylinder 38 to accommodate the raising and lowering of the platform from the table surface 40 of the apparatus. With reference to FIGS. 1 and 3 it can be seen that a loading chute 42 is provided for accommodating a plurality of the articles or workpieces to be inspected, which comprise in the illustrated embodiment internal tooth ring gears 44. Loading chute 42 is provided with an opening or gate 46 (FIG. 1) and a power actuated plunger 48 whereby individual ring gears 44 can be pushed through cooperating aperture 50 in frame wall 16 and upon the platform 36. Upon being loaded on the platform 36, the ring gear 44 can be raised to a position where the outer peripheral surface of the gear is in contact with the surface portion 32 of pads 30 of each of the jaw members 20, 22, 24 and 26. As seen in FIG. 3, a ramp surface 52 is provided on each of the pad portions of the jaw members to facilitate proper positioning of the gear 44. Likewise, one or more of the pads 30 can be mounted on the shaft of the jaw members as by means of spring 53 illustrated in connection with jaw 24 in FIG. 2 so as to further accommodate proper positioning of the workpiece.

To provide rotation of the gear 44 for inspection purposes, a shaft 54 driven by a motor 56 carried on frame horizontal member 58 is provided with an end portion 60 capable of engaging the teeth of the gear. As can be seen with particular reference to FIG. 2, the gear is rotated on the surface of the platform 36 and its axis of rotation is fixed by light pressure engagement of the jaw members with the outer periphery of the gear.

In order to detect dimensional irregularities or out of roundness in the gear, a sensor is provided which will generate an output signal in response to the irregularity. While any type of sensor can be used such as magnetic, optical or mechanical, an electromechanical transducer has been found to produce excellent results. The output signal from the transducer is fed into a logic network composed of, for example, AND circuits. A series of limit switches actuated by a cam which is mechanically synchronized to the driven shaft 54 are also connected with the AND circuits. Accordingly, if the transducer generates an output signal in response to a dimensional irregularity in the gear, such as a high spot, the logic circuit will develop a signal which is effective to record and return the gear to a position where a power actuated piston or ram can exert pressure on the high spot.

In the illustrated embodiment of this invention, one of the jaw members 26 is connected with a hydraulic or pneumatic power cylinder 62 whereby the pad portion of the jaw member is movable in a plane generally normal to the axis of rotation of the gear 44 and is thereby capable of exerting a compressive force on the gear 44. Actuation of the jaw member is controlled by the logic network and it will be appreciated that a separate power producing device could be employed in lieu of utilizing a jaw member.

As mentioned above, excellent results have been achieved with the use of an electromechanical sensor such as a linear variable differential transformer. In FIG. 2 of the drawings, a transducer 64 is shown located in a bore 66 provided in the power actuated jaw 26. The transducer includes a stem 68 which is biased into engagement with the outer peripheral surface of the gear 44. It will be understood that the transducer could be otherwise positioned with respect to the circumference of the gear if desired. As the gear is rotated by the driven shaft 54, the stem 68 of the transducer will be axially displaced upon reaching a high spot on the surface of the gear being inspected. This will in turn cause an output signal from the transducer to be fed into the logic network as mentioned above. As a transducer of the linear variable differential transformer type produces an electrical output signal proportional to the displacement of the stem, it is apparent that controls such as 70 can be provided to easily establish suitable inspection tolerances, as for example by threshold responsive circuits, such as biased amplifying devices.

In operation, the operator adjusts the jaw members 20, 22, 24 and 26 by means of handles 34 so that the outer peripheral surface of the gear 44, is lightly engaged by each of the jaw members thereby establishing a fixed axis of rotation for the gear. Likewise, threshold responsive circuits are adjusted to establish the desired tolerance for the particular gear. A plurality of gears are then stacked into load chute 42 and the machine is actuated. At this point, the plunger 48 will introduce a gear upon the platform 36 which then raises the gear to a position where it is frictionally engaged by the pad portion of the jaw members and where the internal teeth of the gear 44 mesh with the end portion gear 60 of the driven shaft 54. The gear 44 is rotated on the surface of the platform 36 with the stem portion of the transducer 64 riding on the outer peripheral surface of the gear 44. The logic network will cause the gear to be rotated for a full scan or 360° of the gear surface. If no output signal from the transducer is generated in response to a highpoint on the gear upon scanning thereof, the platform will return to the level of table surface 40 and the gear will be pushed from the machine through aperture 72 in frame wall 12 and slide chute 74. However, if a transducer output signal is fed to the logic network in response to a high spot on the gear, the gear will be rotated through the remainder of the 360° scan and then positioned such that the high spot is in contact with pad 30 of the power actuated jaw 26 which will then be actuated in response to a signal from the logic network and compress the gear 44. As indicated above, the logic network can be composed of AND circuits which are responsive to the transducer and to a plurality of limit switches actuated by a cam synchronized with to the driven shaft 54, with each of such limit switches being effective over a given angle of rotation of the shaft. Accordingly, upon an input signal from the transducer and limit switch the logic network will cycle the gear to a position adjacent the power actuated jaw. Such control circuits are familiar to those of skill in the art of machine programming.

After the gear 44 has been compressed by the jaw 26, it will again be scanned through a full 360° revolution and again subjected to compression if undesirable high spots are encountered. The number of times the gear is subject to scanning can readily be set by the operator as well as the amount of pressure to be applied by the jaw member. At the end of the scanning cycle, the platform will lower and, if the gear is still out of round, will be ejected through a reject chute 76 by means of a plunger 77.

Figure 4:
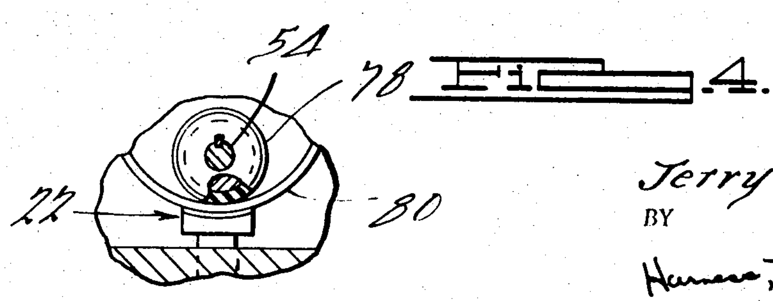
FIG. 4, is a sectional view showing a second embodiment of the driving means used to rotate the article to be inspetced relative to the sensor.

The apparatus described hereinabove has been used with great success and found to provide extremely accurate results. Moreover, it is readily adaptable to handle a wide variety of parts. For example, FIG. 4 illustrates an embodiment which can be employed with workpieces having smooth inner peripheral walls such as bearings, piston rings and the like. In this instant, the driven shaft 54 is provided with an end portion 78 which is fabricated of for example rubber and which frictionally engages the inner peripheral surface of a piston ring 80.

From the foregoing description, it is seen that the detection and correction device of this invention is a relatively uncomplicated, economical device which can be used to handle a wide variety of parts. For example, it has been used in connection with sintered internal tooth ring gears of a diameter of approximately 4.5 inches to bring out of roundness of as much as 0.025 inch into an acceptable limit of about 0.001 inch. Accordingly, it is believed apparent that the objects of this invention have been obtained and it will be understood that modifications and variations may be effected without departing from the scope of the novel concepts of the present invention as defined in the appended claims.

I claim:

1. An automatic device for sensing and correcting dimensional irregularities of a curved surface of an article, said device comprising a frame, a plurality of jaw members carried by said frame, and a platform for supporting said article for rotation about its axis, said platform capable of reciprocating movement for moving said article to and from contact with said jaw members, said jaw members being circumferentially spaced with respect to the curved surface of the article and having a shaft portion adjustably engaged with the frame and a pad carried by said shaft having a surface portion substantially conforming to the curved surface of the article for frictional engagement therewith, means rotating said article about its axis, a sensor for producing signals in response to dimensional irregularities of said curved surface, control means responsive to the signals from said sensor, and pressure producing means responsive to said control means for applying pressure to the curved surface of said article, said pressure producing means comprising at least one of said jaws and a power cylinder for actuation of said jaw.

2. A device according to claim 1, wherein the means rotating said article comprises a rotatable driven shaft which is provided with an end portion for engaging said article and for rotating said article relative to said platform and to said sensor.

3. A device for determining the departure from true circularity of an article and for rounding-up the article which comprises a frame, a plurality of jaw members carried by said frame and disposed so as to be in engageable relationship with circumferentially spaced areas on the peripheral surface of the article, a platform capable of reciprocating movement for moving said article to and from contact with said jaw members, a rotatable driven shaft provided with an end portion for engaging said article and rotating said article about its axis and relative to said jaw members, a sensor for gaging the circularity of the periphery of said article and producing signals in response to dimensional irregularities therein, control means responsive to signals from said sensor, and pressure producing means for rounding-up the article comprising at least one of said jaws and a power cylinder for actuation of said jaw, said control means controlling the actuation of the rotatable shaft and the pressure producing means.

4. A device according to claim 3, wherein said jaw members are adjustably carried by the frame so as to be capable of accommodating circular articles of varying diameter, wherein the pressure producing jaw engages the article at a place on its surface circumferentially spaced about 180° from another of said plurality of jaws and wherein said pressure producing jaw is movable in a plane generally normal to and towards the axis of rotation of said article so as to compress said article between said pressure producing jaw and said second jaw.

5. A device according to claim 4, wherein said article is a generally circular ring, wherein said ring is supported on the surface of the platform such that its diameter is generally parallel with said platform, and wherein the outermost circular periphery of said ring is engaged by said jaw members so as to establish the axis of rotation of said ring with respect to said platform.

6. A device according to claim 5, wherein said sensor is an electro-mechanical transducer disposed in one of said jaw members and having a stem member in engageable relationship with the outer circular periphery of said ring member, said stem member being capable of axial movement to produce a signal, said signal varying as a function of the amount of said axial movement.

7. A device for determining the departure from true circularity of an article and for rounding-up the article which comprises a frame, a plurality of jaw members carried by said frame and disposed so as to be in engageable relationship with circumferentially spaced areas on the peripheral surface of the article, a platform capable of reciprocating movement for moving said article to and from contact with said jaw members, means rotating said article relative to said jaw members, a sensor for gaging the circularity of the periphery of said article, control means responsive to signals from said sensor, and pressure producing means for rounding-up the article comprising at least one of said jaws and a power cylinder for actuating of said jaw, said control means controlling the actuation of said pressure producing means.

References Cited

UNITED STATES PATENTS

| | | | |
|---|---|---|---|
| 1,555,972 | 10/1925 | Hervig | 72—31 |
| 2,487,629 | 11/1949 | Aller et al. | 33—178 |
| 1,928,457 | 9/1933 | Mershon et al. | 33—178 |

CHARLES W. LANHAM, Primary Examiner

M. J. KEENAN, Assistant Examiner

U.S. Cl. X.R.

72—32, 402